Sept. 10, 1935.   A. J. KOHLBECK   2,013,889
MULTIPLE DRIVE AUTOMATIC CLUTCH
Filed Aug. 28, 1933
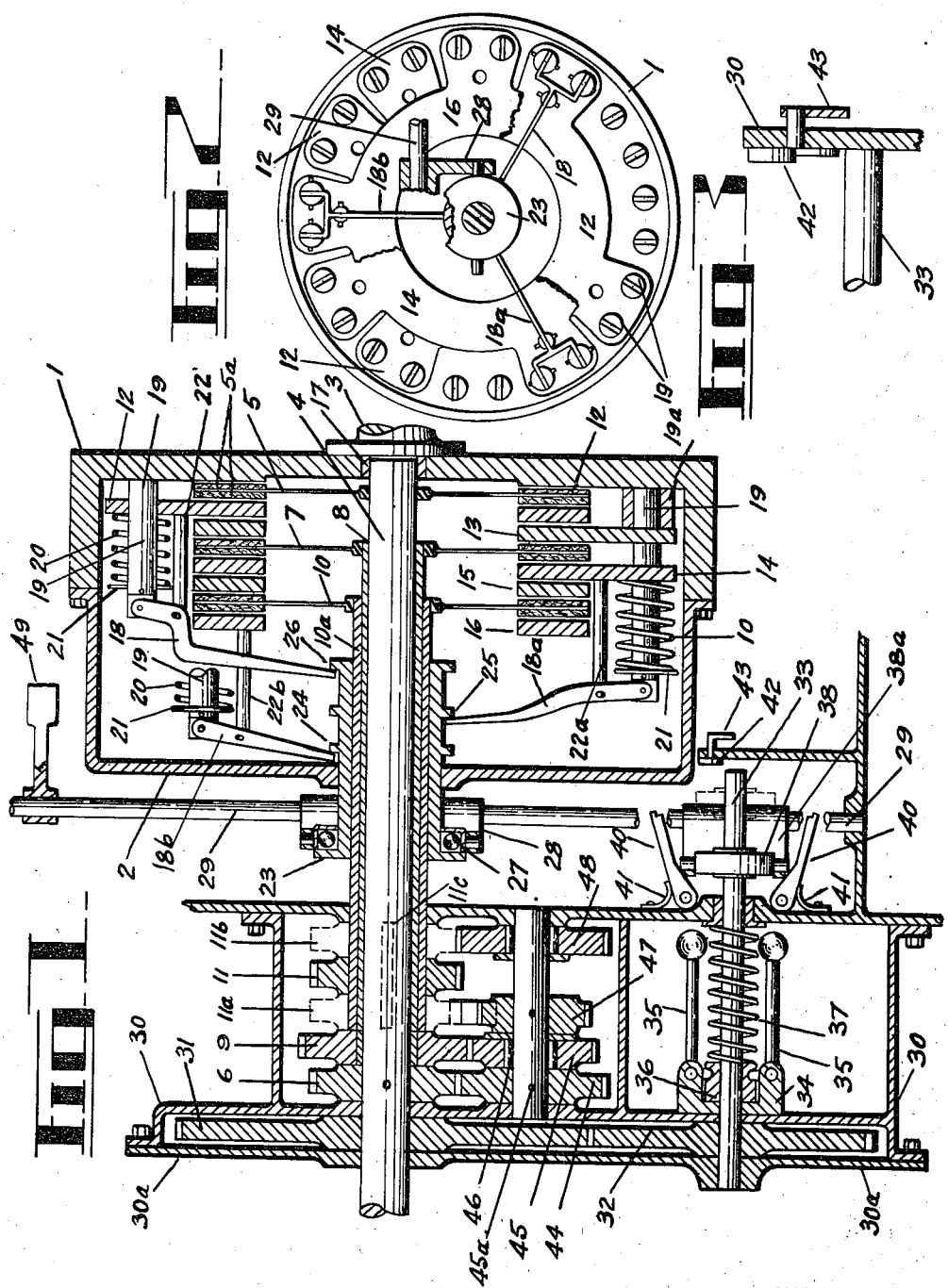
INVENTOR
Anton J Kohlbeck
BY
Charles W. Dale
ATTORNEY Patented Sept. 10, 1935

2,013,889

UNITED STATES PATENT OFFICE 2,013,889

MULTIPLE DRIVE AUTOMATIC CLUTCH

Anton J. Kohlbeck, Muskegon Heights, Mich.

Application August 28, 1933, Serial No. 687,190

2 Claims. (Cl. 74—336.5)

The present invention relates to multiple drive automatic clutch and its object is, generally, to provide an improved power transmitting clutch for motor vehicles whereby changes in speed are obtained, smoothly, without clash of gears and automatically.

These and any other objects and more specific objects hereinafter appearing, are attained by, and the invention finds preferable embodiment in the structure particularly described in the body of this specification and illustrated by the accompanying drawing, in which Figure 1 is a fragmentary longitudinal section view.

Figure 2 is a plan view in part section of the friction plates and operating mechanism removed from the housing; the friction plates 14—15 and 16 broken.

Figure 3 is an enlarged part section of the governor cut out.

Similar reference numerals refer to similar parts throughout the several views of the drawing.

1 represents a flywheel of an engine which together with 2 form the housing for the clutch members. 3 represents a portion of the engine shaft attached to the flywheel 1. 4 is the propeller or driven shaft and 5 is the high or direct drive friction plate attached to the shaft 4. Carried by the shaft 4 is the gear 6 for driving the shaft 4 in intermediate and low speed and reverse rotation. 7 represents the intermediate speed friction plate attached to a sleeve 8, surrounding the shaft 4, and on the opposite end of which is carried the gear 9, which transmits power delivered to the gear 8 to the gear 45 on the countershaft 45ª. 10 represents the low speed friction plate attached to the sleeve 10ª surrounding the sleeve 8. On the opposite end of the sleeve 10ª is carried the gear 11, which is slidable thereon and driven by the sleeve by a spline or feather key. The purpose of the gear 11 is to transmit when in the position designated as 11ª the reverse rotation to the shaft 4 through a suitable train of gears not shown, and the gear 47 to the countershaft 45ª and the gear 45 to the gear 6 carried by the shaft 4. And when the gear 11 is in the position 11ᵇ, low speed is transmitted to the shaft 4 through the gear 48 on the shaft 45ª. Attached to the friction plates is suitable lining 5ª for transmitting the power from the driving member to the friction plates when clamped by the pressure plates. 12 represents the pressure plate for the high or direct speed friction plate. 13 and 14 are the pressure plates for the intermediate friction plate. 15 and 16 are the pressure plates for the low speed friction plate. 17 represents the bearing for the end of the shaft 4. 18 is the operating lever for the high or direct speed pressure plate 12. 18ª is the operating lever for the intermediate pressure plate 14, and 18ᵇ is the operating lever for the low speed pressure plate 16. The operating levers for the pressure plates 13 and 15 are not shown. 19 represents the supporting studs carried by the housing for the pressure plate operating levers and to which they are pivoted. 19 are studs attached to the flywheel portion of the housing and supporting the pressure plates and operating levers. 19ª is a spacing collar for the pressure plates maintaining the pressure plate in juxtaposition with the friction plate 7. 20 are coil springs which lend a flexibility to the movement of the pressure plates. 21 is abutting collar for the spring 20. 22 represents studs attached to the pressure plates and through which the pressure plates are moved by their operating levers. 23 represents a slidable flanged sleeve provided with annular collars 24, 25, and 26 surrounding the sleeve 10ª which through longitudinal movement caused by movement of the operating fork yoke 28 attached to the shaft 29 with pedal 49 and the collars 24, 25 and 26 operate the levers as 18, 18ª and 18ᵇ. The collars 24, 25 and 26 being so spaced from each other that the levers 18 for low speed will be first operated and next the levers 18ª for the intermediate speed and last the levers 18ᵇ for the high or direct speed as the sleeve 23 is moved longitudinally by the forked yoke 28 or the order may be reversed or any combination desired had by different spacing of the collars 24, 25 and 26 on the sleeve. Likewise, a greater number of speeds than shown may be arranged for. 30 represents the transmission gear housing and 30ª the cover therefore. 31 and 32 represent the gears for driving a governor shaft 33, carrying the governor collar 34, weights 35, tension collar 36, coil spring 37 and collar 38. 38ª represents a forked yoke whereby the governor shaft 33 is caused to be locked against longitudinal movement by the governor weights through the collar 36. 40 are pawls for positioning the governor in the weights extended position relative to the speed desired, and which may be released by the fork 38ª. 41 are springs resting against the pawls whereby they are forced to their locking position. 42 represents a removable stop for preventing extreme longitudinal movement of the shaft 33. 43 is the operating lever or handle for the stop 42. 44, 45, 47 and 48 represent the transmission gears previously mentioned and 49 the foot pedal by which the shaft 29 is turned to operate the clutch members and the forked yoke 38a. In operation, the clutch being in neutral position, the foot pedal, 49 is depressed releasing the pressure plates successively from contacting with the friction plate in which position the engine shaft will be free to rotate without rotating the friction plates and upon releasing the foot pedal, the pressure plates will be released and forced by the coil spring 10—20 against their respective friction plates. First the low speed pressure plate, will be released and the car will be started slowly, next the intermediate pressure plate will be released and pressed by its coil springs against the intermediate speed friction plate and last the high or direct speed pressure plate will be released and pressed against the high or direct speed friction plate by the coil springs 20, at which time all of the pressure plates will be engaging their respective friction plates and the engine will then be delivering its high or direct speed power to the propeller shaft. The gears 45 and 48 being provided with releases as the one-way clutch 46, of gear 45 at which time the gears will rotate more rapidly, than the shaft 45a, and the clutch 46 will allow the gear as 45 to revolve freely on the shaft 45a, allowing the shaft 45a to be revolved by the gears 6 and 44 at equal speed with the propeller shaft 4, and only the friction plate 5 will then be driving the shaft 4. The pawls 40 and the stop 42 allow either low or intermediate speeds to be selected and prevent a higher speed than the speed that is selected to be operated with.

The invention being intended to be pointed out in the claims, is not to be limited to or by details of construction of any particular embodiment thereof illustrated in the drawing as hereinbefore described.

I claim:

1. In a multiple drive clutch for motor driven vehicles, the combination with a housing driven by the motor of the vehicle, a propeller shaft for driving the vehicle and extending into the housing provided with a friction clutch plate secured to the propeller shaft within the housing; a sleeve surrounding the propeller shaft and provided with a friction clutch plate secured to the end of the sleeve within the housing and a drive gear secured to the other end outside the housing; a secondary sleeve shorter than the first said sleeve and surrounding the same, the secondary sleeve also carrying a friction clutch plate secured to it within the housing and a drive gear slidably secured to the other end outside the housing; a flanged sleeve surrounding the aforesaid sleeves and slidably secured to the other end outside the slidable longitudinal thereof and provided with a plurality of spaced apart collars; a plurality of spring pressed pressure plates moveably secured to studs within the housing, a plurality of operating levers pivotally secured to the said pressure plates and to the studs at one end with the free end of each lever pressed against the collars of the third mentioned sleeve whereby longitudinal movement of the said sleeve will operate the said levers and allow the pressure plates to engage the friction plates, and means comprising a forked yoke whereby the said third mentioned sleeve is moved longitudinally.

2. In a multiple drive clutch for motor vehicles, the combination of a housing rotated by the motor of the vehicle, a propeller shaft for driving the vehicle by the clutch plates, a plurality of clutch plates within the housing, one of said clutch plates secured to the propeller shaft at its end, a sleeve slidable on the propeller shaft having a clutch plate secured to one of its ends and a gear to its opposite end, a sleeve slidable on the first said sleeve and having a clutch plate secured to one of its ends and a gear secured to its opposite end and a sleeve slidable on the second mentioned sleeve and having a plurality of collars in spaced relation to each other surrounding the periphery thereof and a plurality of pivoted levers for individually operating the clutch plates by the said collars by longitudinal movement of the last mentioned sleeve and means for moving the sleeve longitudinally.

ANTON J. KOHLBECK.